United States Patent [19]
Shintani

[11] Patent Number: 5,646,608
[45] Date of Patent: Jul. 8, 1997

[54] APPARATUS AND METHOD FOR AN ELECTRONIC DEVICE CONTROL SYSTEM

[75] Inventor: Peter Shintani, Tokyo, Japan

[73] Assignee: Sony Corporation, Tokyo, Japan

[21] Appl. No.: 362,056

[22] Filed: Dec. 22, 1994

[30] Foreign Application Priority Data

Dec. 27, 1993 [JP] Japan ................................ 5-329382

[51] Int. Cl.$^6$ ..................................................... H04Q 9/02
[52] U.S. Cl. .................. 340/825.52; 340/825.72; 340/825.37; 359/147
[58] Field of Search ........................ 340/825.72, 825.25, 340/825.37, 825.52, 825.56, 825.24, 825.69; 359/147; 455/603; 348/134; 21/48; 358/194.1

[56] References Cited

U.S. PATENT DOCUMENTS

| | | | |
|---|---|---|---|
| 4,703,359 | 10/1987 | Rumbolt et al. | 340/825.69 X |
| 4,728,949 | 3/1988 | Platte et la. | 340/825.69 X |
| 4,764,981 | 8/1988 | Miyahara et al. | 340/825.69 X |
| 4,825,209 | 4/1989 | Sasaki et al. | 340/825.72 |
| 5,086,298 | 2/1992 | Katsu et al. | 340/825.72 X |
| 5,109,222 | 4/1992 | Welty | 340/825.72 |
| 5,410,326 | 4/1995 | Goldstein | 340/825.72 X |
| 5,438,325 | 8/1995 | Nishigaki et al. | 340/825.25 X |

FOREIGN PATENT DOCUMENTS

| | | | |
|---|---|---|---|
| 0 566 516 A1 | 10/1993 | European Pat. Off. | 340/825.72 |
| 58-116896 | 7/1983 | Japan | 340/825.72 |

*Primary Examiner*—Brian Zimmerman
*Assistant Examiner*—William H. Wilson, Jr.
*Attorney, Agent, or Firm*—Charles M. Fish, Esq.; Pasquale Musacchio, Esq.; Jerry A. Miller

[57] ABSTRACT

Each of plural electronic devices, e.g., a television receiver, a video disc player, a video tape recorder, an audio amplifier, and a compact disc player which are placed in an audiovisual room has a light emitter and a light detector. Identification signals corresponding to the respective electronic devices are outputted from the light emitters thereof to a single remote control unit. When the remote control unit detects the identification signals, the remote control unit displays on its display unit information required to selectively operate the electronic devices corresponding to the detected identification signals. The remote control unit displays only the information relative to the electronic devices disposed in the audiovisual room. The single remote control unit can control the plural electronic devices in the audiovisual room.

10 Claims, 12 Drawing Sheets

APPARATUS AND METHOD FOR AN ELECTRONIC DEVICE CONTROL SYSTEM

FIELD OF THE INVENTION

The present invention relates to an electronic device control system, an electronic device control method, and an electronic device control apparatus which are suitable for use in a home automation system, for example.

BACKGROUND OF THE INVENTION

Recently, many electronic devices for home use have been able to be controlled by remote control units. For example, audiovisual devices including television receivers, video tape recorders, compact disc players, and video disc players, and other devices including air-conditioning units and lighting devices can be controlled by remote control units.

As a result, each home has may remote control units, and the user has difficulty in finding a place to keep them in.

One remote control unit that has been proposed to solve the problem has a ROM for storing control signals for a plurality of electronic devices so that those electronic devices can be controlled by the single remote control unit. The remote control unit has switches assigned to the respective controllable electronic devices. When the user operates one of the switches, the remote control unit can control the electronic device which corresponds to the operated switch.

There has also been known a programmable remote control unit which can be operated by the user as desired to store control signals for certain electronic devices in a RAM.

The remote control unit with its ROM storing control signals for a plurality of electronic devices is required to have many switches and buttons if it is to be able to control many electronic devices. For controlling a desired one of the electronic devices, the user has difficulty in selecting a corresponding one of the switches and buttons. Therefore, the remote control unit is poor in its operability and tends to large in size.

SUMMARY OF THE INVENTION

It is therefore an object of the present invention to provide a remote control unit which has good operability and is small in size.

According to the present invention, there is provided an electronic device control system comprising an electronic device placed in a room, and a remote control unit for controlling the electronic device, the electronic device comprising identification storing means for storing an identification of the electronic device, identification signal output means for outputting an identification signal representing the identification to the remote control unit, and control signal detecting means for detecting a control signal outputted from the remote control unit, the remote control unit comprising, control signal output means for outputting the control signal to the electronic device, identification signal detecting means for detecting the identification signal outputted from the electronic device, and display means for displaying a menu required to operate the electronic device corresponding to the identification signal when the identification signal detecting means detects the identification signal.

An identification signal outputted from the electronic device, e.g., a compact disc player, is detected by the identification signal detecting means, e.g., a light detector, of the remote control unit. At this time, a liquid crystal display of the remote control unit displays a menu required to operate the compact disc player.

The electronic device control system may comprise a plurality of electronic devices placed in the room, the display means comprising means for displaying a menu for selecting one of the electronic devices. Therefore, the plural electronic devices can be reliably controlled by the single remote control unit.

According to the present invention, there is also provided a method of controlling a plurality of electronic devices in a room with a remote control unit, comprising the steps of assigning different identifications to the electronic devices, respectively, causing the electronic devices to output signals representing the respective identifications into a space in the room, and displaying information necessary to selectively operate the electronic devices corresponding to the identifications on a display unit of the remote control unit when the remote control unit detects the signals representing the respective identifications. The step of causing the electronic devices to output signals may comprise the step of causing the electronic devices to output infrared radiations as the signals.

Different identifications are assigned respectively to the electronic devices, and the electronic devices output signals representing the respective identifications into the space in the room. When the remote control unit detects the signals representing the respective identifications, the remote control unit displays on its display unit information necessary to selectively operate the electronic devices corresponding to the identifications. The electronic devices can be reliably controlled by the remote control unit which may be small in size.

According to the present invention, there is also provided an electronic device control apparatus comprising signal output means for outputting a control signal to control an electronic device, signal detecting means for detecting an identification signal from the electronic device, and display means for displaying a menu required to operate the electronic device corresponding to the identification signal when the signal detecting means detects the identification signal.

The electronic device control apparatus may further comprise memory means for storing control signals to control a plurality of electronic devices, the signal output means comprising means for reading a control signal required to control one of the electronic devices which corresponds to an identification signal from the memory means and outputting the control signal read from the memory means when the signal detecting means detects the identification signal.

When the signal detecting means, e.g., a light detector, detects an identification signal, the display means, e.g., a liquid crystal display, displays a menu required to operate the electronic device corresponding to the identification signal. The electronic device control apparatus has improved operability and may be reduced in size.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
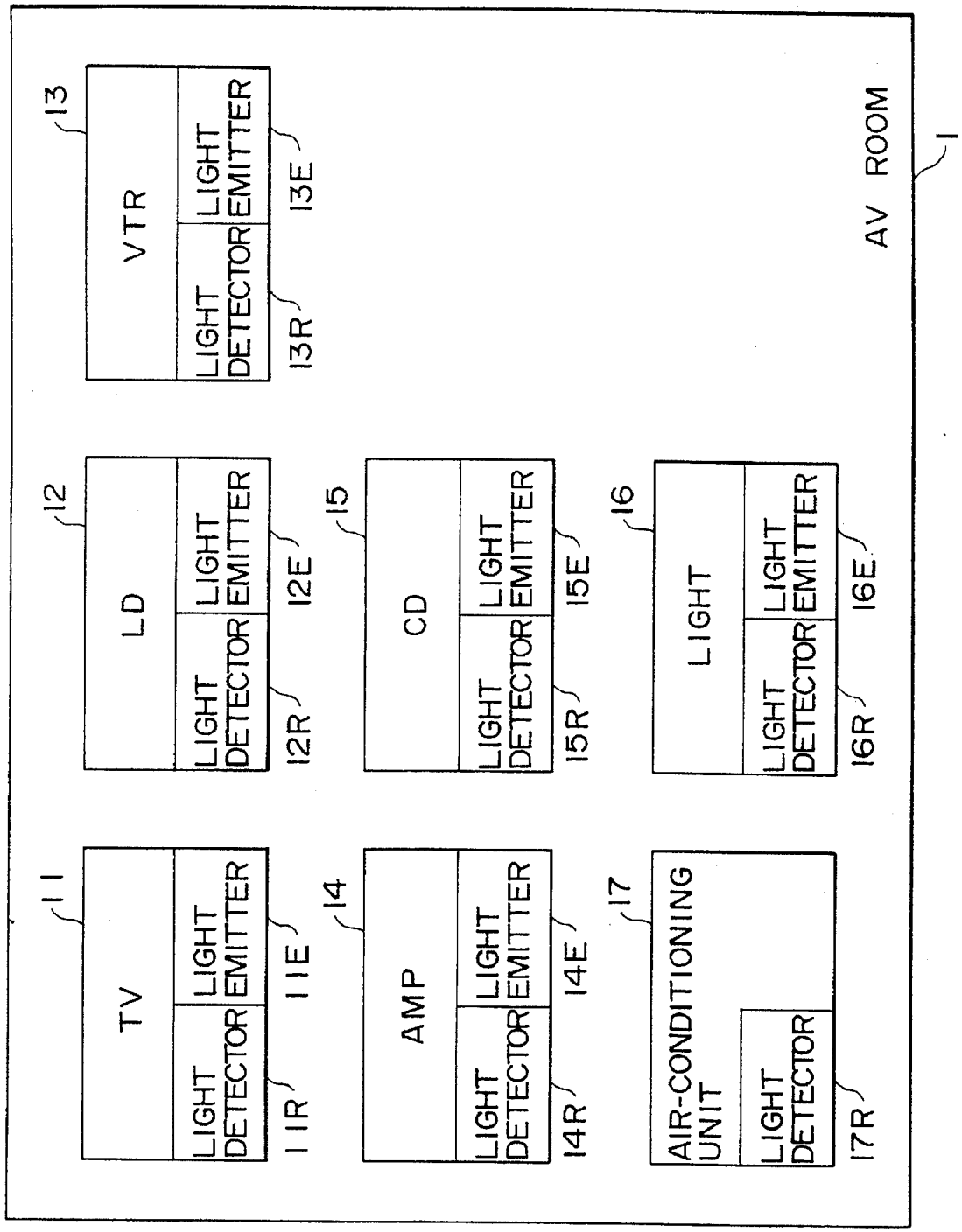
FIG. 1 is a plan view showing an arrangement of electronic devices in an audiovisual room.
Figure 2:
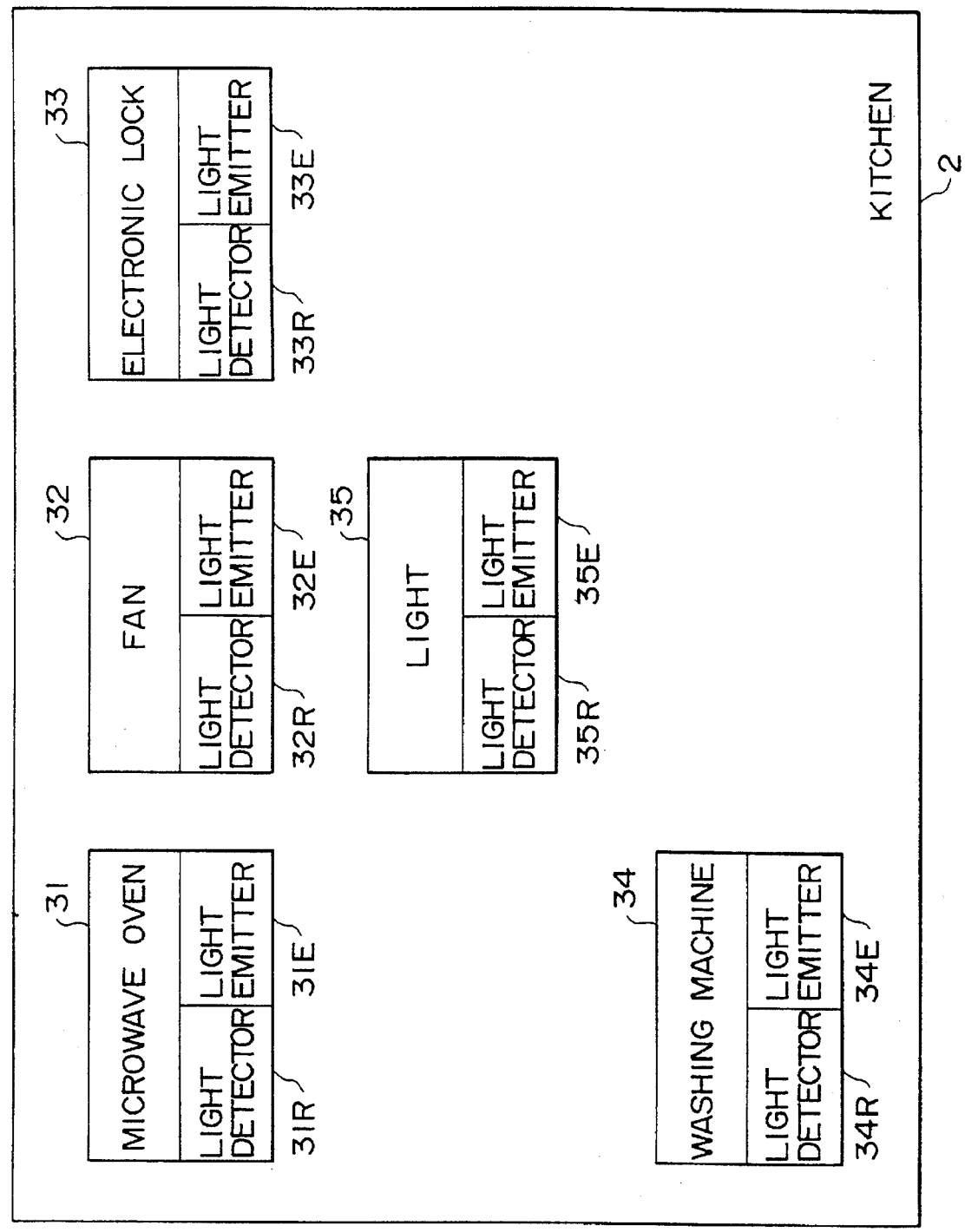
FIG. 2 is a plan view showing an arrangement of electronic devices in a kitchen.

FIGS. 1 and 2 show arrangements of electronic devices in an audiovisual room 1 and a kitchen 2, respectively.

The audiovisual room 1 shown in FIG. 1 accommodates a television receiver (TV) 11, a video disc player (LD) 12, a video tape recorder (VTR) 13, an audio amplifier (AMP) 14, and a compact disc player (CD) 15. The audiovisual room 1 also has a lighting device (LIGHT) 16 for illuminating the interior space of the audiovisual room 1. The temperature in the audiovisual room 1 can be adjusted by an air-conditioning unit 17.

The electronic devices except the air-conditioning unit 17 in the audiovisual room 1 have respective light emitters 11E through 16E for outputting an infrared radiation signal to a remote control unit, which will be described later on with reference to FIG. 3, and respective light detectors 11R through 16R for detecting an infrared radiation signal outputted from the remote control unit. The air-conditioning unit 17 has no light emitter, but has a light detector 17R only.

The kitchen 2 shown in FIG. 2 accommodates a microwave oven 31, a fan 32, and a washing machine 34. The kitchen 2 also has a lighting device (LIGHT) 35 for illuminating the interior space of the kitchen 2, and an electronic lock 33 for electronically locking and unlocking the door to the kitchen 2.

The electronic devices in the kitchen 2 have respective light emitters 31E through 35E and respective light detectors 31R through 31R.

Figure 3:
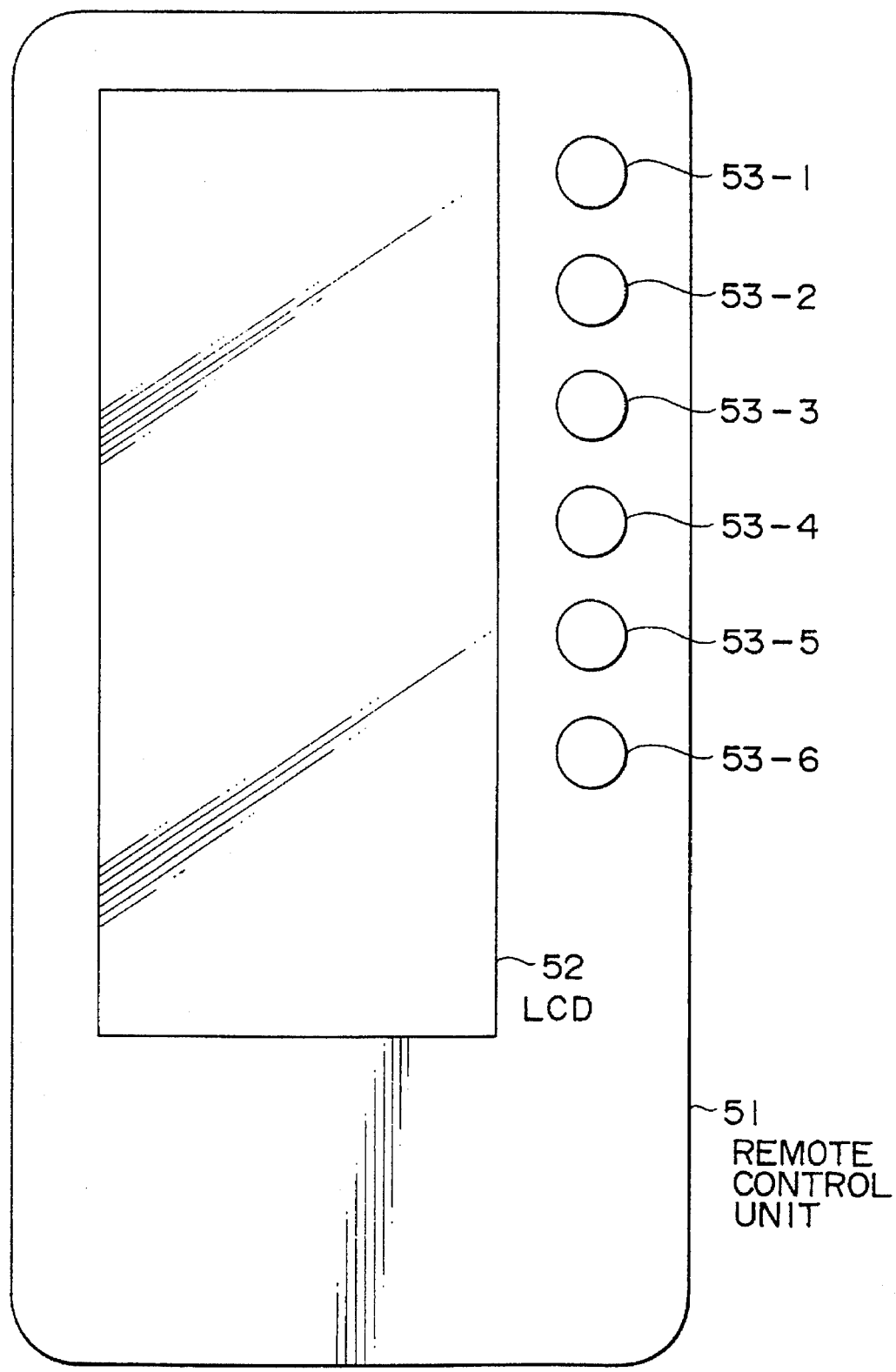
FIG. 3 is a plan view of a remote control unit.

FIG. 3 shows a single remote control unit 51 for controlling the electronic devices disposed in the audiovisual room 1 shown in FIG. 1 and the electronic devices disposed in the kitchen 2 shown in FIG. 2. The remote control unit 51 has a liquid crystal display (LCD) 52 on its upper panel for displaying letters, graphic patterns, and icons as required. Further, the remote control unit 51 also has six buttons 53-1 through 53-6 on the right-hand side of the LCD 52.

The electronic devices shown in FIGS. 1 and 2 and the kitchen 2 and the remote control unit 51 shown in FIG. 3 jointly make up a home automation system.

Figure 4:
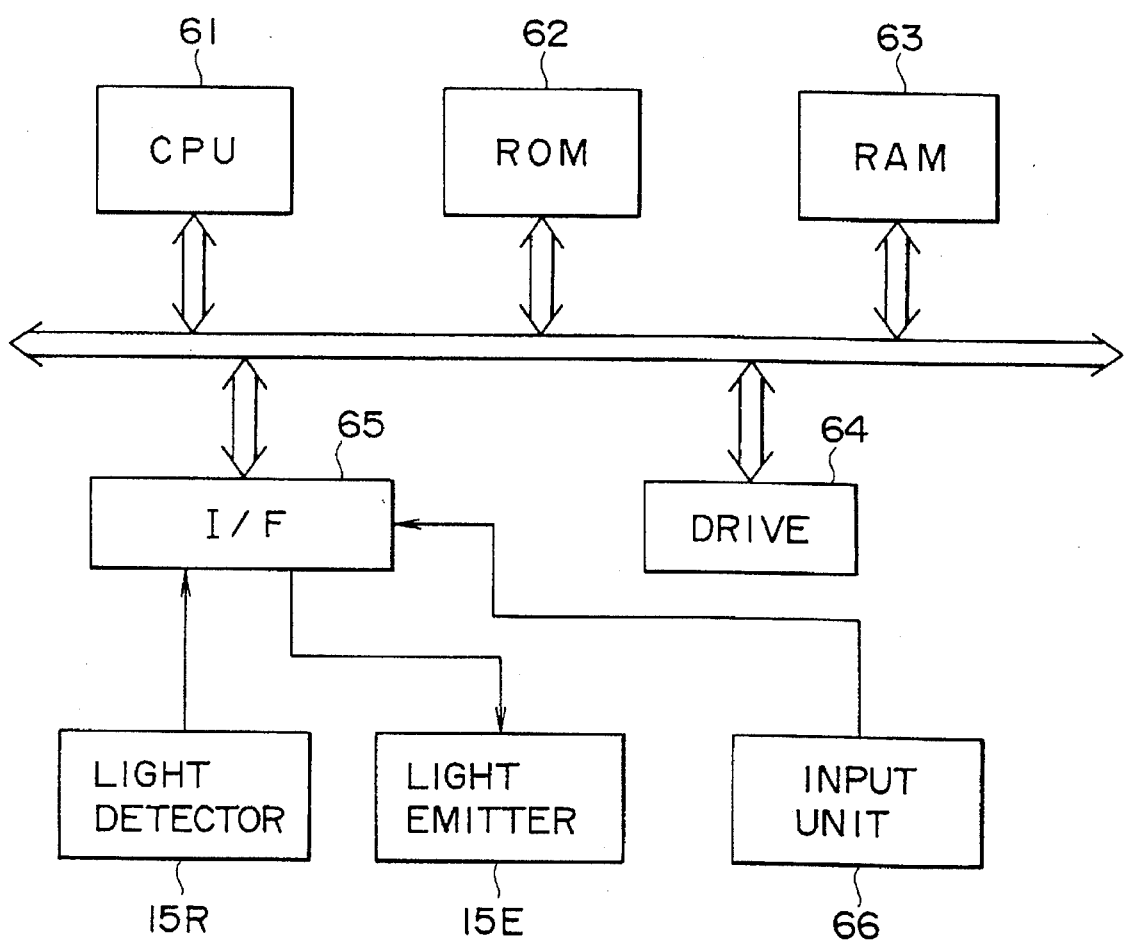
FIG. 4 is a block diagram of an internal arrangement of a compact disc player in the arrangement shown in FIG. 1.

Referring to FIG. 4 in conjunction with FIG. 1, an internal arrangement for the compact disc player 15 is shown. The compact disc player 15 has a CPU 61 for controlling various parts of the compact disc player 15 to effect certain operations according to a program stored in a ROM 62, and a RAM 63 for storing data required for the CPU 61 to carry out various processing sequences.

The CPU 61 can be supplied with various commands through an interface (I/F) 65 when the user operates an input unit 66 composed of switches and buttons. The user can also operate the remote control unit 51 shown in FIG. 3 to output an infrared radiation, which is detected by the light detector 15R of the compact disc player 15 that supplies a detected signal as a command through the I/F 65 to the CPU 61.

The CPU 61 controls the light emitter 15E to emit an infrared radiation which carries a signal representing a predetermined ID stored in the ROM 62, to the remote control unit 51.

The compact disc player 15 also has a drive unit 64 which is controlled by the CPU 61 to play back a compact disc loaded therein to reproduce a recorded signal from the compact disc.

Each of the other electronic devices shown in FIGS. 1 and 2, whose internal arrangements are omitted from illustration, has an assigned ID (identification) that is stored in its ROM and can output an infrared signal representing the assigned ID from its light emitter.

Figure 5:
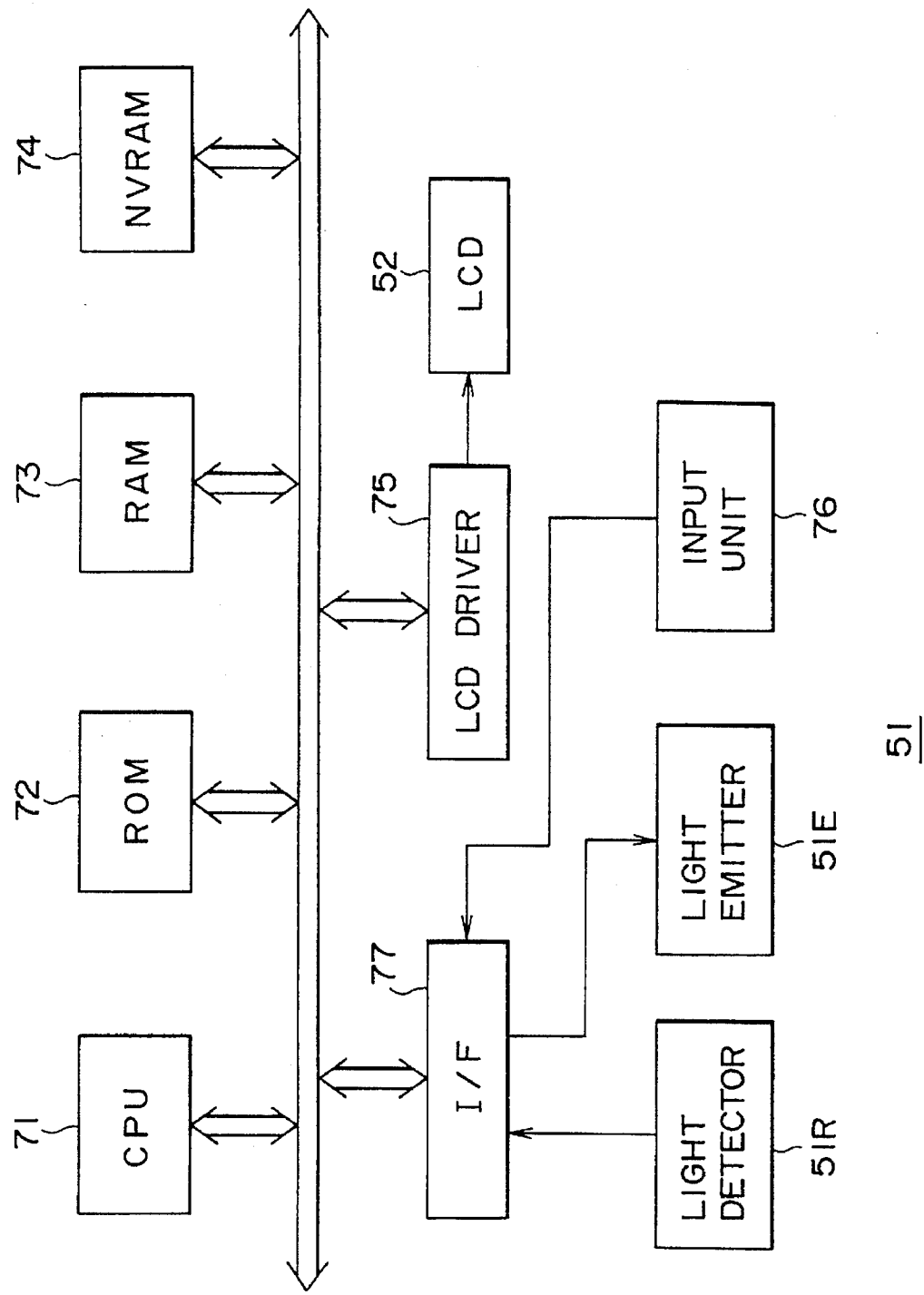
FIG. 5 is a block diagram of an internal arrangement of the remote control unit shown in FIG. 3.

FIG. 5 shows in block form an internal arrangement of the remote control unit 51. The remote control unit 51 has a CPU 71 for controlling various parts of the remote control unit 51 to effect certain operations according to a program stored in a ROM 72, and a RAM 73 for storing data required for the CPU 71 to carry out various processing sequences. The remote control unit 51 also has an NVRAM 74 for storing necessary data which can be retained even after the remote control unit 51 is turned off.

Various commands can be inputted from an input unit 76 composed of various switches and buttons (including the buttons 53-1 through 53-6 shown in FIG. 3) through an interface (I/F) 77 to the CPU 71. ID signals carried by infrared radiations outputted by the light emitters of the electronic devices shown in FIGS. 1 and 2 are detected by a light detector 51R, and supplied through the I/F 77 to the CPU 71. The CPU 71 controls a light emitter 51E through the I/F 77 to output control signals to the electronic devices. The remote control unit 51 further includes a liquid crystal display (LCD) 52 which can be energized by an LCD driver 75 to display given information. Further, it is noted that a touch screen device may be used to provide "soft" buttons for selection of each appliance.

It is noted that the electronic devices in the audiovisual room 1 and the kitchen 2 and the remote control unit 51 may also be adapted for emitting and detecting RF signals to enable two way communication between the remote control 51 and the electronic devices and thus control of the electronic devices. Further, the electronic devices may be connected to a powerline to enable communication therebetween through a known proposed standard for a CE bus.

Figure 6:
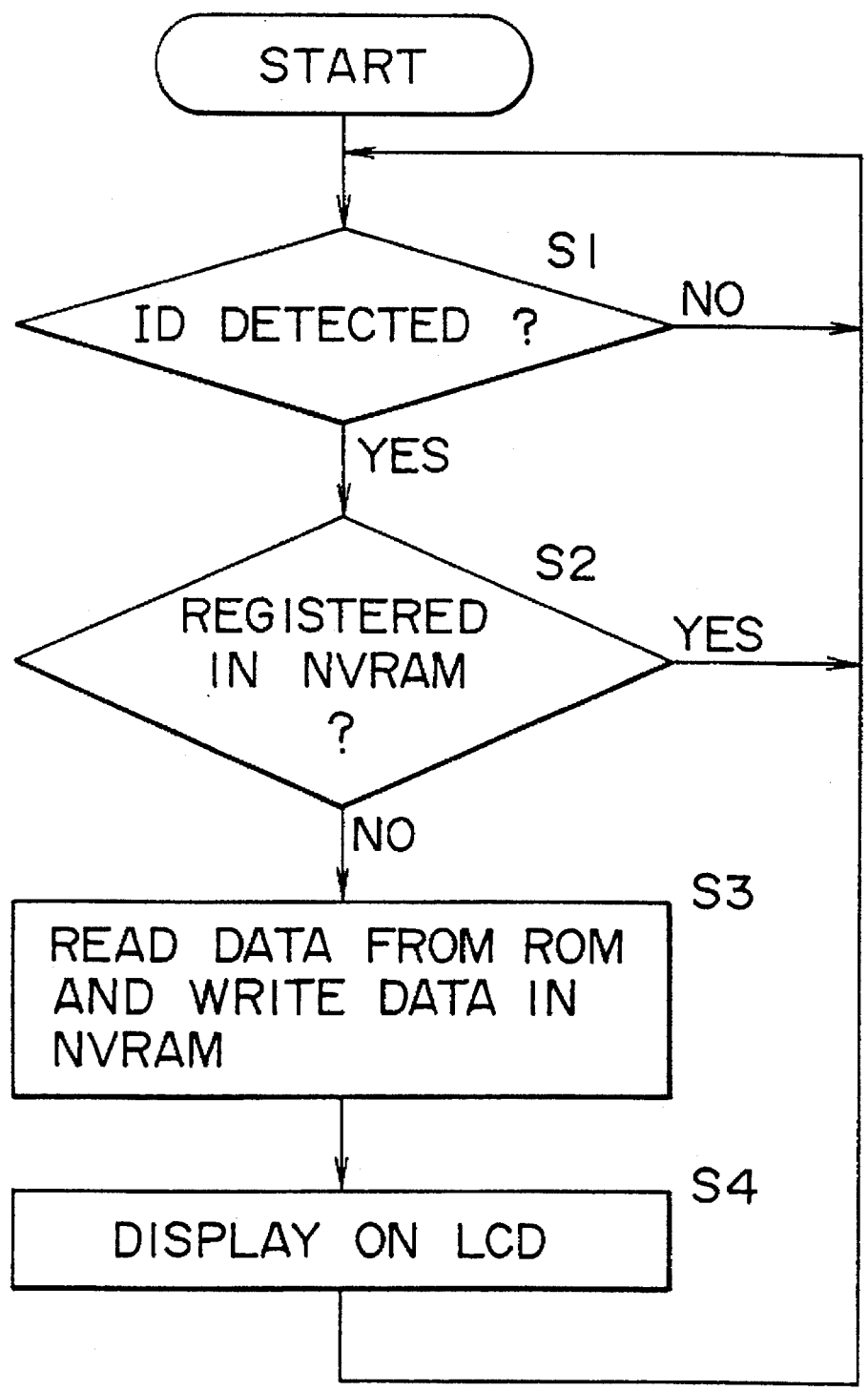
FIG. 6 is a flowchart of an operation sequence of the remote control unit shown in FIG. 5.

An operation sequence of the remote control unit 51 will be described below with reference to FIG. 6. The user carries the remote control unit 51 shown in FIG. 3 and enters the audiovisual room 1 or the kitchen 2. The light emitters of the electronic devices in the audiovisual room 1 radiate infrared ID signals into the space in the audiovisual room 1. Similarly, the light emitters of the electronic devices in the kitchen 2 radiate infrared ID signals into the space in the kitchen 2. Therefore, when the user who is carrying the remote control unit 51 goes into the audiovisual room 1 or the kitchen 2, the remote control unit 51 detects the infrared ID signals being radiated in the audiovisual room 1 or the kitchen 2.

In a first step S1, the CPU 71 of the remote control unit 51 determines whether an ID signal has been detected through the light detector 51R or not. If no ID signal has been detected, then the CPU 71 waits until it detects an ID signal. If an ID signal has been detected, then control proceeds to a step S2 in which the CPU 71 determines whether or not a control signal corresponding to the detected ID signal has been read from the ROM 72 and the control signal has been registered in the NVRAM 74. If not registered, then control goes to a step S3 in which the CPU 71 reads a control signal corresponding to the detected ID signal from the ROM 72 and registers the control signal in the NVRAM 74. Then, in a step S4, the CPU 71 controls the LCD driver 75 to display on the LCD 52 information required to selectively operate the electronic device that corresponds to the ID signal detected in the step 1.

After the step S4, control returns to the step S1 to repeat the above process. When an ID signal is detected in the step S2, control proceeds again to the step S2 to determine a control signal corresponding to the detected ID signal has already been registered in the NVRAM 74. If already registered, control goes back to the step S1 for repeating the above process.

Figure 7:
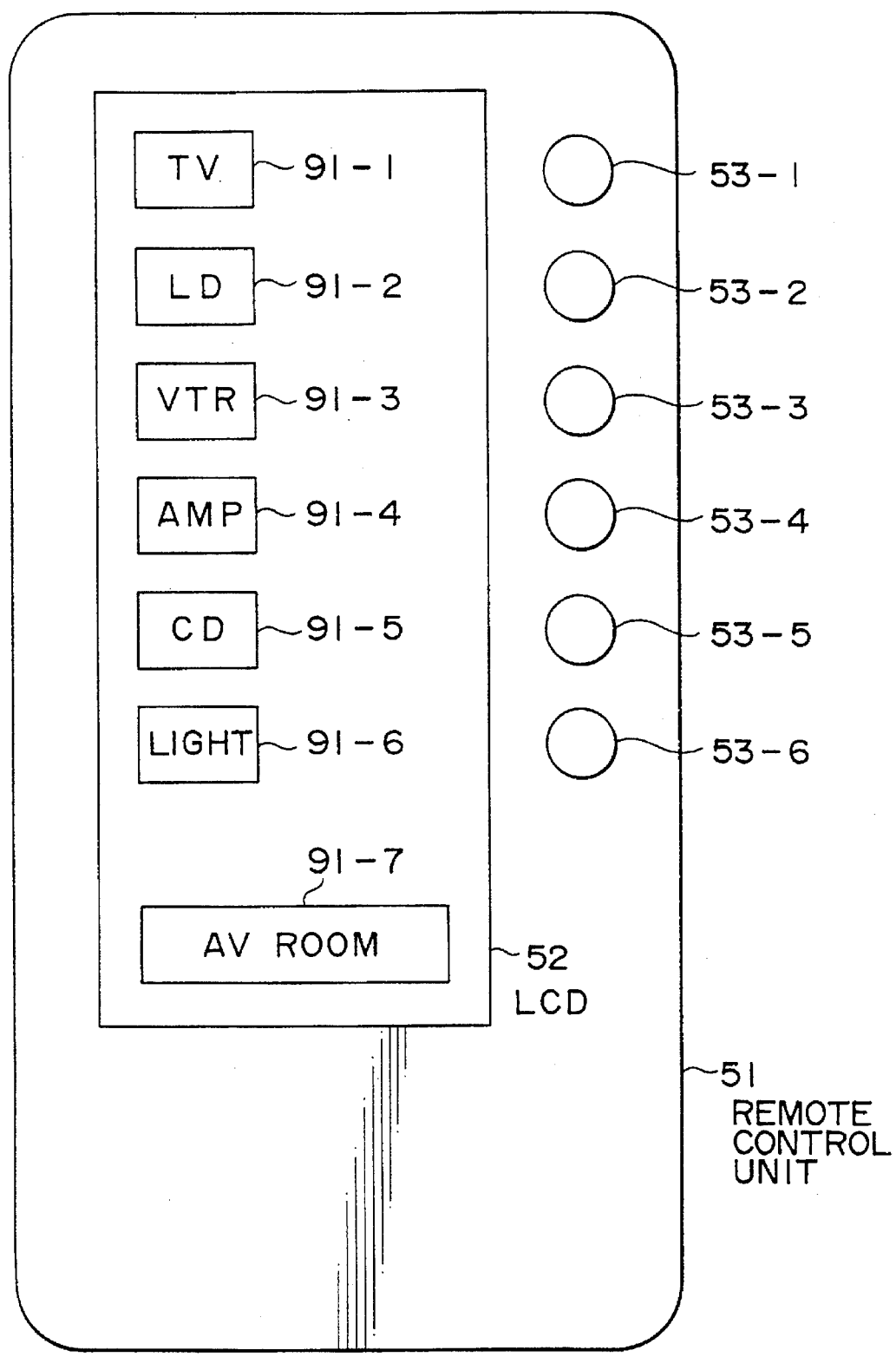
FIG. 7 is a plan view showing information displayed on a liquid crystal display of the remote control unit shown in FIG. 3 at the time the remote control unit is placed in the audiovisual room shown in FIG. 1.

When the user carrying the remote control unit 51 enters the audiovisual room 1, the LCD 52 of the remote control unit 51 displays information such as shown in FIG. 7.

More specifically, the LCD 52 displays representations 91-1 through 91-6 corresponding respectively to the buttons 53-1 through 53-6. The representations 91-1 through 91-6 are associated respectively with the television receiver (TV) 11, the video disc player (LD) 12, the video tape recorder (VTR) 13, the audio amplifier (AMP) 14, the compact disc player (CD) 15, and the lighting device (LIGHT) 16 which are placed in the audiovisual room 1.

The LCD 52 also displays a representation 91-7 indicating that the present position of the remote control unit 51 is in the audiovisual room 1. The user can have the name of this room stored in the NVRAM 74 in association with a certain electronic device, e.g., the lighting device 16 shown in FIG. 1. When the CPU 71 of the remote control unit 51 detects the ID signal from the light emitter 16E of the lighting device 16, the CPU 71 reads the registered name from the NVRAM 74 and causes the LCD 52 to display the representation 91-7, i.e., "AV ROOM".

Figure 8:
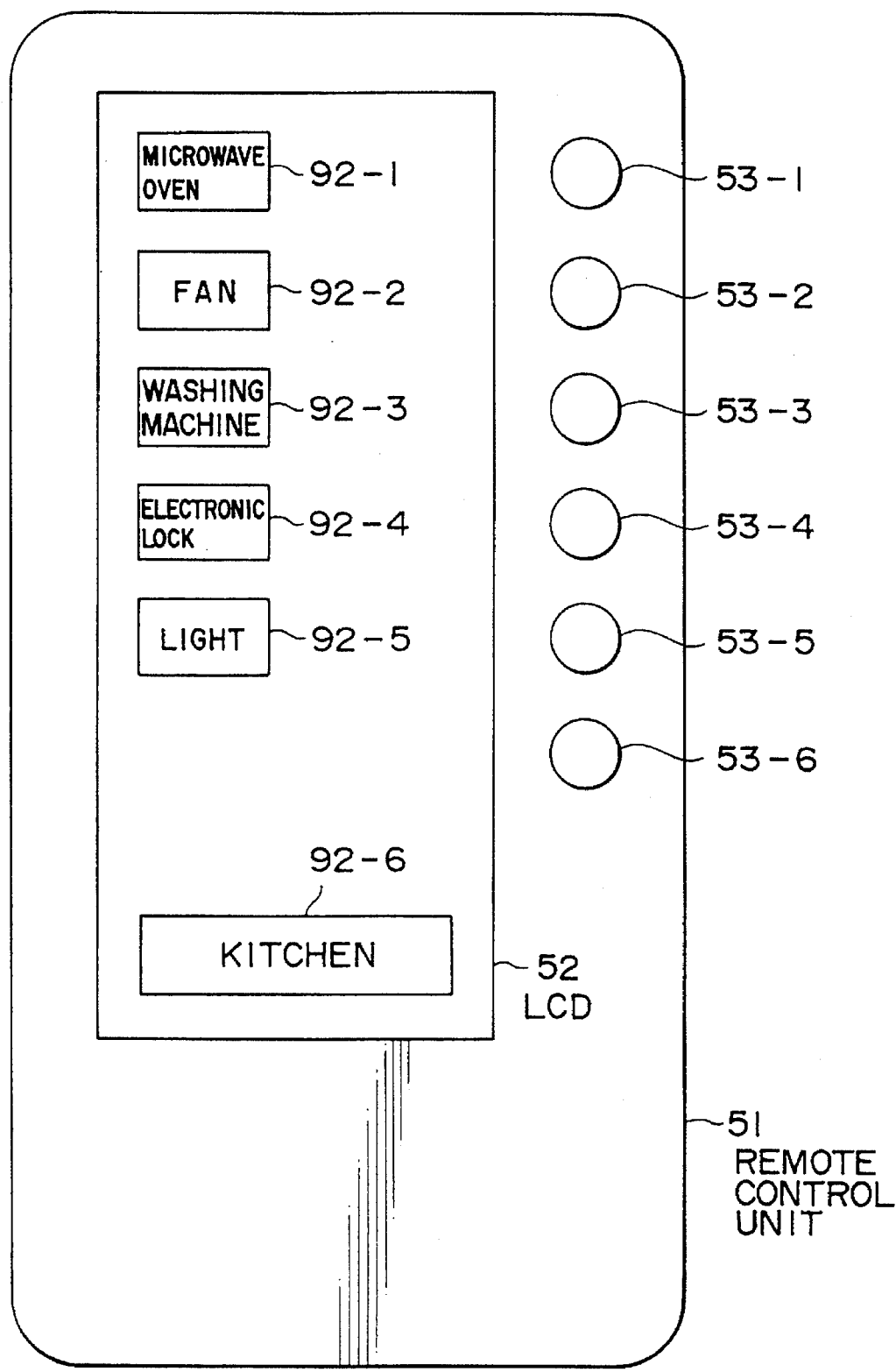
FIG. 8 is a plan view showing information displayed on the liquid crystal display of the remote control unit at the time the remote control unit is placed in the kitchen shown in FIG. 2.

FIG. 8 shows information displayed on the LCD 52 at the time the remote control unit 51 is placed in the kitchen 2 shown in FIG. 2. As shown in FIG. 8, when the remote control unit 51 is placed in the kitchen 2, the LCD 52 displays representations 92-1 through 92-5 corresponding to the respective buttons 53-1 through 53-5 in association respectively with microwave oven 31, the fan 32, the washing machine 34, and the lighting device 35 which are disposed in the kitchen 2. If the name "KITCHEN" has been registered in the NVRAM 74 in association with the ID signal outputted from the lighting device 35, for example, then when the CPU 71 detects the ID signal from the lighting device 35, the CPU 71 reads the registered name from the NVRAM 74 and causes the LCD 52 to display a representation 92-6, i.e., "KITCHEN".

Figure 9:
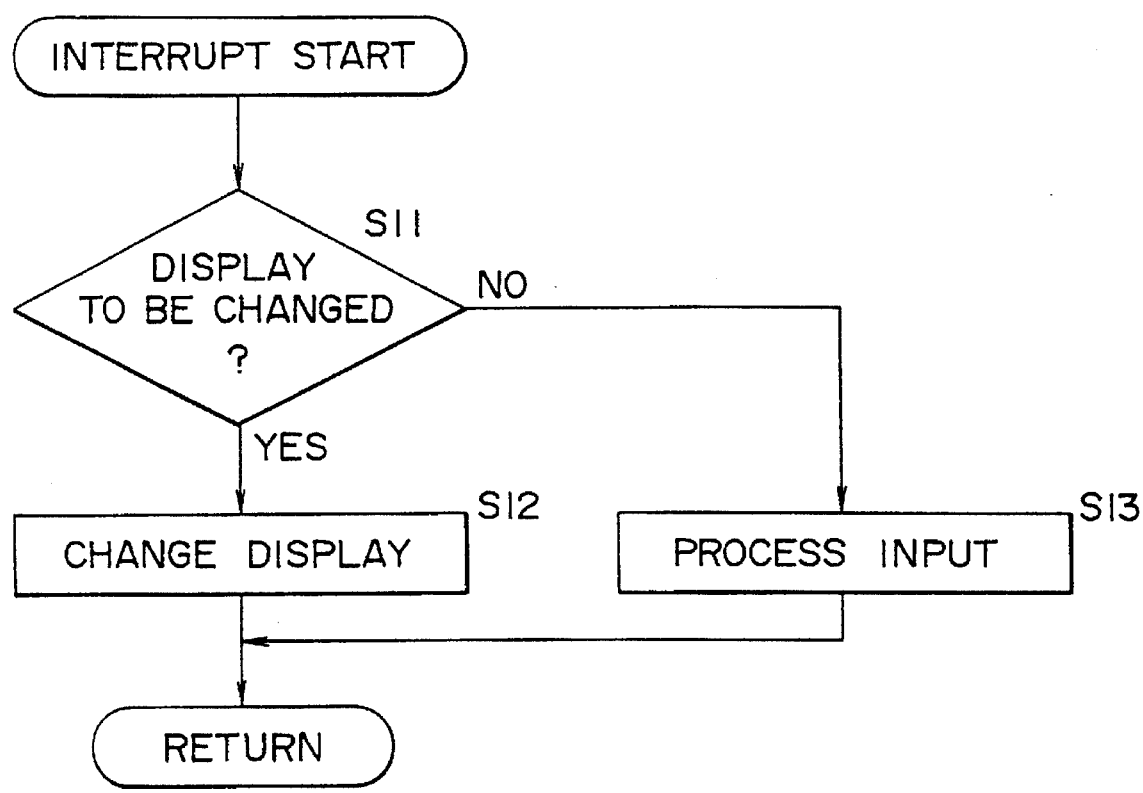
FIG. 9 is a flowchart of an interrupt routine which is executed when a button on the remote control unit shown in FIG. 7 or 8 is pressed by the user.

If the user operates any of the buttons 53-1 through 53-6 while the representations shown in FIG. 7 or 8 are being displayed on the LCD 52, then the CPU 71 of the remote control unit 51 executes an interrupt routine as shown in FIG. 9.

First, the CPU 71 determines whether the information displayed on the LCD 52 needs to be changed in a step S11. If the displayed information needs to be changed, then control proceeds to a step S12 in which the CPU 71 changes the displayed information. If the displayed information does not need to be changed, then control proceeds to a step S13 in which the CPU 71 processes the input.

Figure 10:
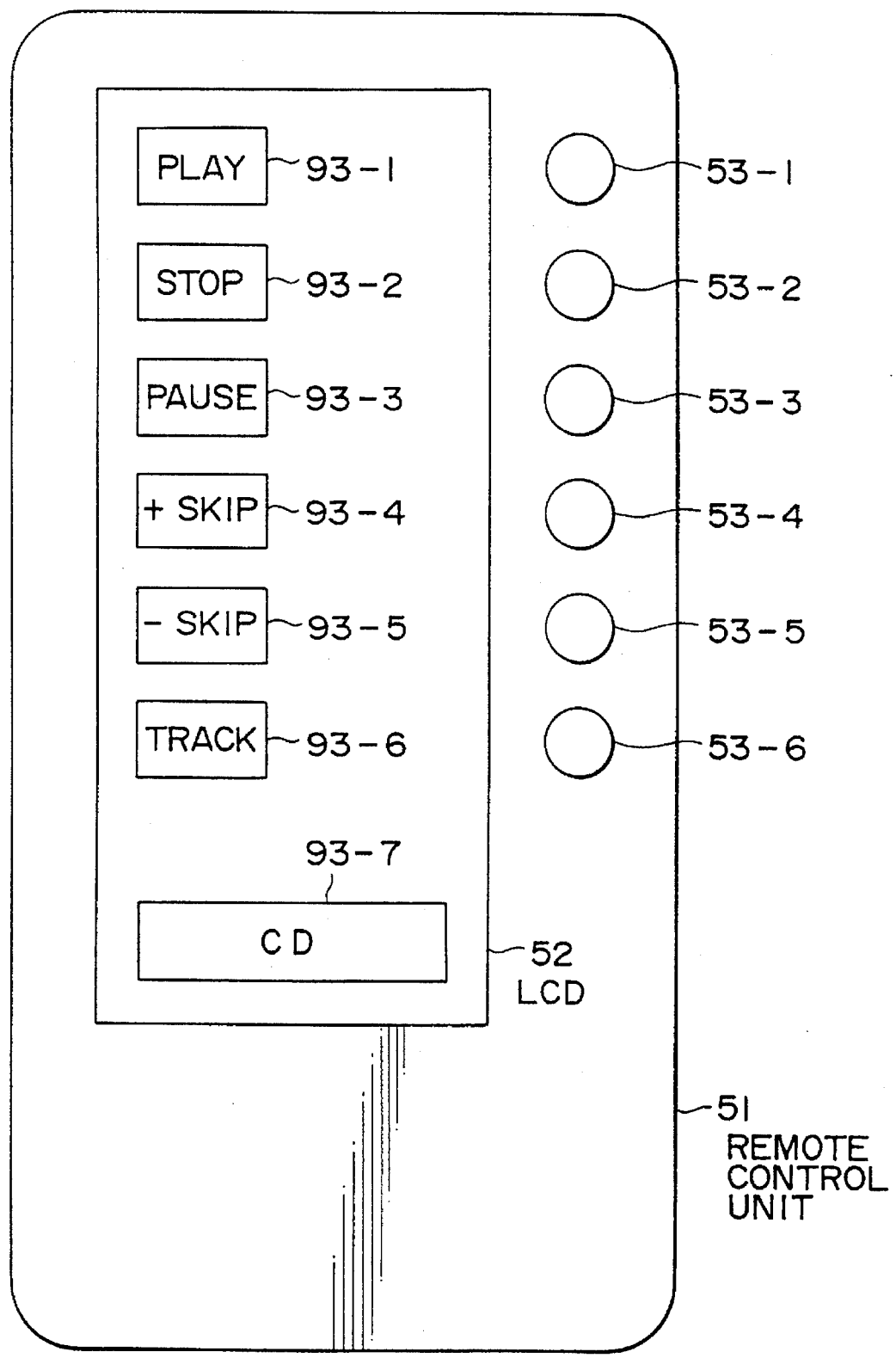
FIG. 10 is a plan view showing how the information displayed on the liquid crystal display varies at the time one of the buttons on the remote control unit shown in FIG. 7 is pressed by the user.

If the remote control unit 51 is in the audiovisual room 1, then the LCD 52 of the remote control unit 51 displays the representations shown in FIG. 7. When the user presses the button 53-5, for example, corresponding to the representation 91-5 indicative of the compact disc player 15 while the LCD 52 is displaying the information shown in FIG. 7, the CPU 71 determines that the displayed information needs to be changed, and changes the displayed information into displayed information as shown in FIG. 10. In FIG. 10, the LCD 52 displays representations 93-1 through 93-6 corresponding to the respective buttons 53-1 through 53-6. These representations 93-1 through 93-6 indicate that the corresponding buttons 53-1 through 53-6 are a button for playing back a compact disc, a button for stopping the playback of a compact disc, a button for pausing in the playback of a compact disc, a button for skipping tracks on a compact disc in a forward direction, a button for skipping tracks on a compact disc in a backward direction, and a button for selecting a track to be played back on a compact disc.

The LCD 52 also displays a representation 93-7 which indicates that the remote control unit 51 is presently functioning as a remote control unit for controlling the compact disc player 15.

Figure 11:
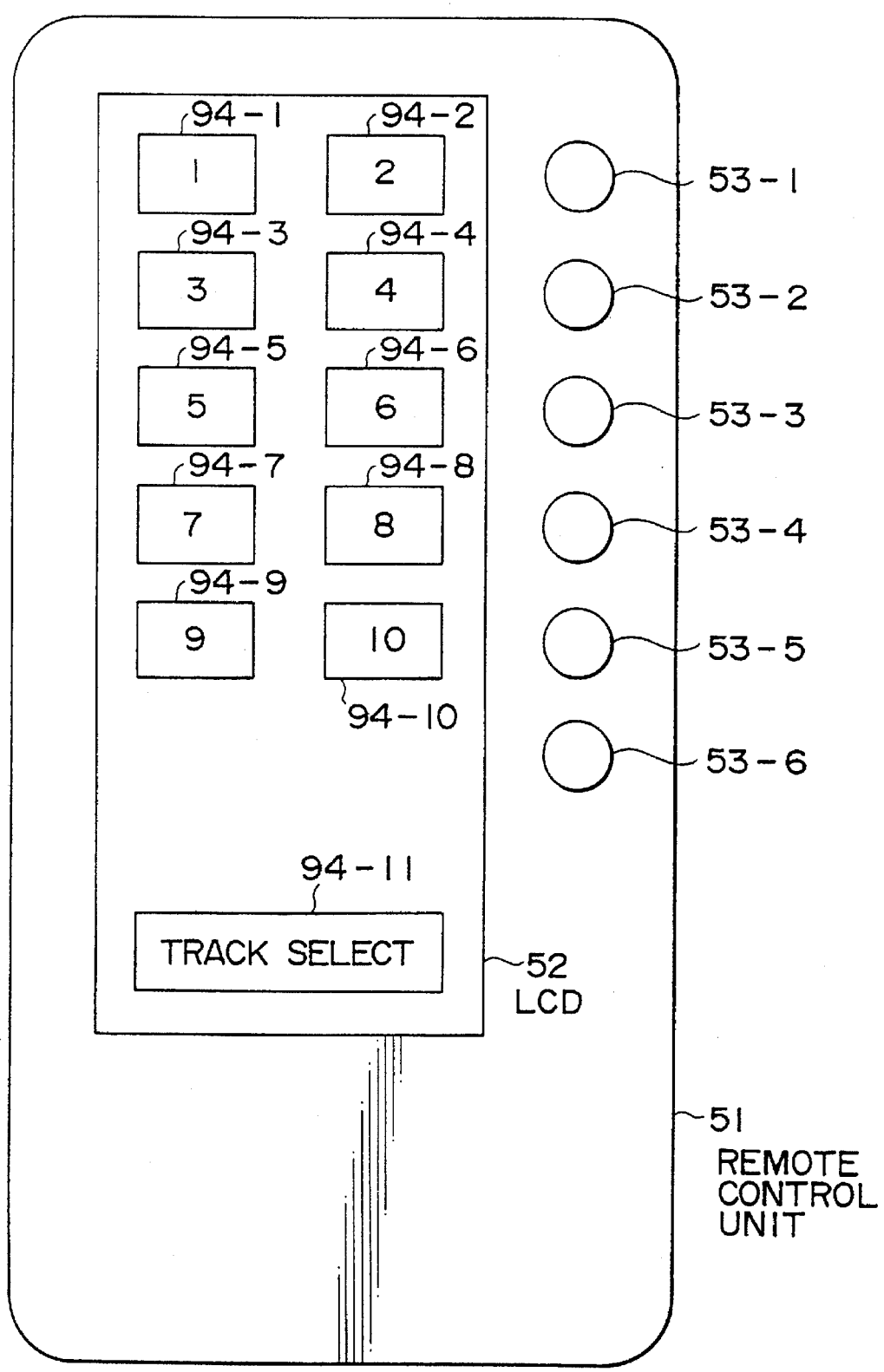
FIG. 11 is a plan view showing how the information displayed on the liquid crystal display varies at the time another button on the remote control unit shown in FIG. 10 is pressed by the user.

When the user presses the button 53-6, for example, while the LCD 52 is displaying the representations 93-1 through 93-7, the CPU 71 determines that the displayed information needs to be changed, and changes the displayed information into displayed information as shown in FIG. 11. In FIG. 11, the LCD 52 displays icons 94-1 through 94-10 with respective numbers "1" through "10" which correspond to respective track numbers of a compact disc, and also displays a representation 94-11 indicating that the remote control unit 51 is currently in a track select mode.

When the user touches the icon 94-5, for example, while the LCD 52 is displaying the information shown in FIG. 11, the CPU 61 of the compact disc player 15 controls the drive unit 64 to play back a fifth track on a compact disc loaded in the compact disc player 15. At this time, the displayed information is not changed. However, it is possible to change the color of the icon 94-5 corresponding the selected track into a color different from the color of the other displayed icons.

If the remote control unit 51 is in the kitchen 2, then the LCD 52 of the remote control unit 51 displays the representations shown in FIG. 8. When the user presses the button 53-3, for example, corresponding to the representation 92-3 indicative of the washing machine 34 while the LCD 52 is displaying the information shown in FIG. 8, the CPU 71 changes the displayed information into displayed information as shown in FIG. 12.

Figure 12:
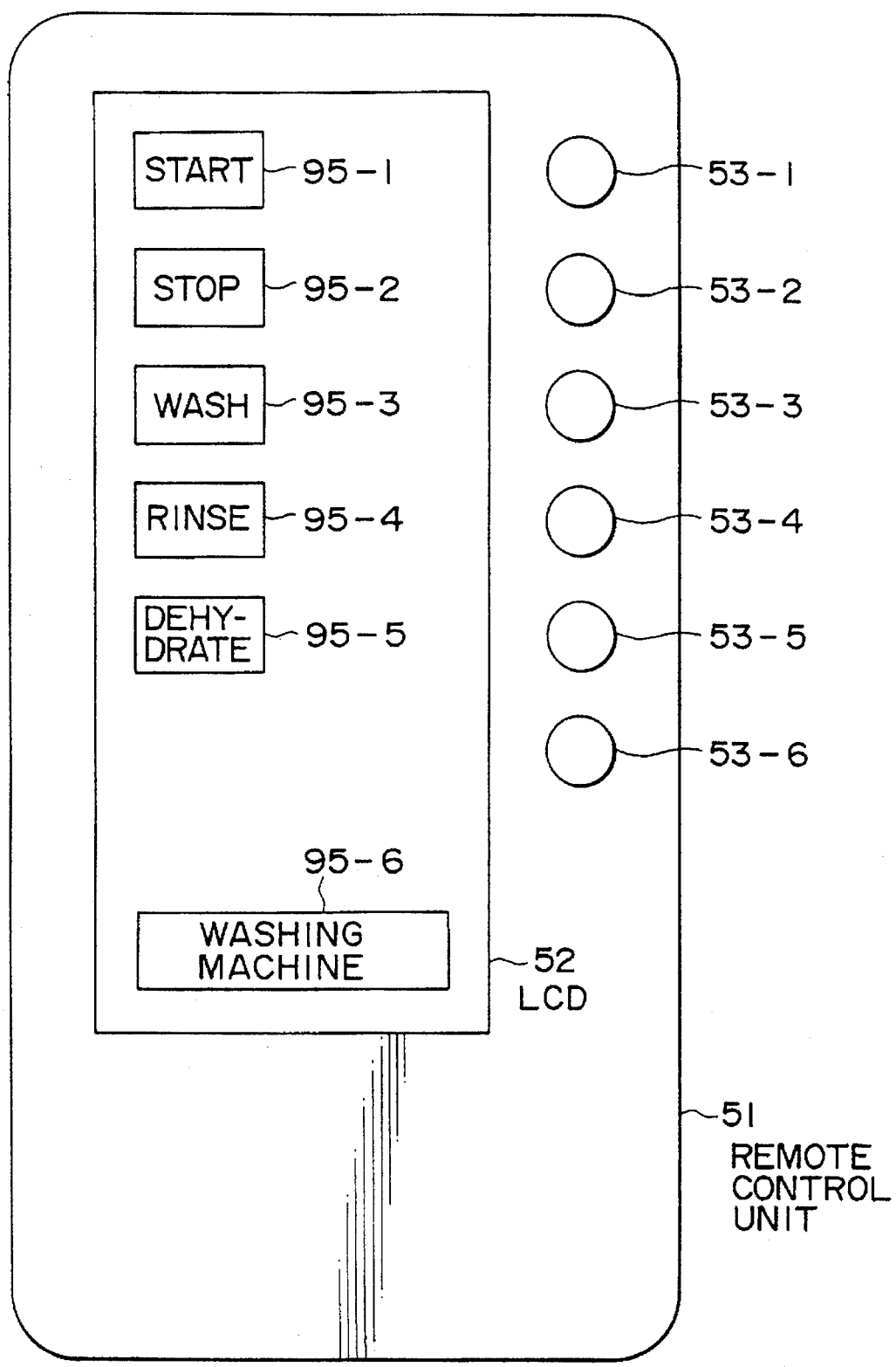
FIG. 12 is a plan view showing how the information displayed on the liquid crystal display changes at the time still another button on the remote control unit shown in FIG. 8 is pressed by the user.

In FIG. 12, the LCD 52 displays representations 95-1 through 95-5 corresponding to the respective buttons 53-1 through 53-5. These representations 95-1 through 95-5 indicate that the corresponding buttons 53-1 through 53-5 are a button for starting washing, a button for stopping washing, a button for selecting a washing mode, a button for selecting a rinsing mode, and a button for selecting a dehydrating mode. The LCD 52 also displays a representation 95-6 which indicates that the remote control unit 51 is presently functioning as a remote control unit for controlling the washing machine 34.

As described above, the CPU 71 of the remote control unit 51 detects ID signals outputted from the electronic devices placed in each of the rooms through the light detector 51R, reads control signals corresponding the detected ID signals, transfers the control signals to the NVRAM 74, and stores them in the NVRAM 74. The CPU 71 then displays information necessary to selectively operate the electronic devices whose data have been stored in the NVRAM 74, on the LCD 52. Therefore, the LCD 52 does not display any information relative to those electronic devices which are not placed in the room in question. Since the displayed information is limited, the user can quickly select any desired one of the electronic devices.

The user is not required to memorize the correspondence between the buttons 53-1 through 53-6 on the remote control unit 51 and the electronic devices which the user has in each of the rooms. Because the information about such correspondence is displayed each time the user takes the remote control unit 51 into each room, it is only necessary for the user to select a button according to the displayed information. After the user has selected a button to select one of the electronic devices, the remote control unit 51 becomes a remote control unit dedicated to control the selected electronic device. The remote control unit 51 also displays information required to control the selected electronic device. The user does not need to memorize the buttons with respect to their functions.

The air-conditioning unit 17 put in the audiovisual room 1 shown in FIG. 1 has no function to output an ID signal. The user may manually operate the remote control unit 51 to control the air-conditioning unit 17 in the same manner as the conventional programmable remote control unit.

The present invention has been described as being applied to a remote control unit for a home automation system. However, the principles of the present invention are also applicable to apparatus such as the Personal Intelligent Communicator (PIC) manufactured by Sony Corporation, Personal Digital Assistant (PDA) and other personal communicator apparatus.

According to the present invention, as described above, the electronic devices output inherent ID signals, and when the remote control unit detects the ID signals, the remote control unit displays menus required to operate the electronic devices corresponding to the ID signals. Consequently, the single remote control unit can control a plurality of electronic devices, and may be small in size.

Although a certain preferred embodiment of the present invention has been shown and described in detail, it should be understood that various changes and modifications may be made therein without departing from the scope of the appended claims.

What is claimed is:

1. An electronic device remote control system comprising:

an electronic device placed in a room; and a remote control unit for controlling said electronic device;

said electronic device comprising:

device identification storing means for storing an assigned identification of the electronic device;

device identification signal output means for outputting an identification signal representing said assigned identification for reception by said remote control unit; and control signal detecting means for detecting a control signal outputted from said remote control unit;

said remote control unit comprising:

control signal output means for outputting the control signal to said electronic device;

identification signal detecting means for detecting the identification signal outputted from said electronic device; and display means for displaying a menu required to operate said electronic device corresponding to said identification signal when said identification signal detecting means detects the identification signal in said room.

2. An electronic device control system according to claim 1, comprising a plurality of electronic devices placed in the room, said display means comprising means for displaying a menu keyed to said room for selectively operating said electronic devices.

3. The system of claim 2 further comprising room remote control unit presence detecting means for causing said plurality of devices to transmit their respective identification signals in response to a remote control presence signal.

4. The system of claim 2 further comprising one or more additional electronic devices lacking said identification storing means and identification signal output means but nonetheless remotely operable using said remote control unit.

5. The system of claim 2, said remote control unit being a multifunction microprocessor controlled communication device selected from the group consisting of Personal Intelligent Communicators and Personal Digital Assistants.

6. An electronic device control apparatus comprising:

signal output means for outputting a control signal to control an electronic device;

signal detecting means for detecting a device identification signal from said electronic device; and display means for displaying a unique operation menu for said electronic device when said signal detecting means detects said device identification signal.

7. An electronic device control apparatus according to claim 6, further comprising memory means for storing control signals to control a plurality of electronic devices, said signal output means comprising means for reading a control signal required to control one of said electronic devices which corresponds to an identification signal from said memory means and outputting the control signal read from said memory means for subsequent transmission by a remote control user to selectively control said device when said signal detecting means detects said device identification signal.

8. A method of controlling a plurality of electronic devices in a room with a remote control unit, comprising the steps of:

pre-assigning different identifications to the electronic devices, respectively;

causing the electronic devices to output identification signals uniquely representing the respective devices into a space in the room; and displaying information necessary to selectively operate the electronic devices on a display unit of the remote control unit, said displayed information corresponding to device identification signals the remote control unit detects in said room.

9. A method according to claim 8, wherein said step of causing the electronic devices to output signals comprises the step of causing the electronic devices to output infrared radiations as said device identification signals in response to transmission of a device identification roll call signal by said remote control unit.

10. The method of claim 8 further comprising the step of correlating a received device identification signal with a room wherein said device is located and displaying said room name, and a device operation menu determined by said room name, on said remote control display.

* * * * *